J. E. HUGHES.
Drill-Jar.
No. 215,622.   Patented May 20, 1879.
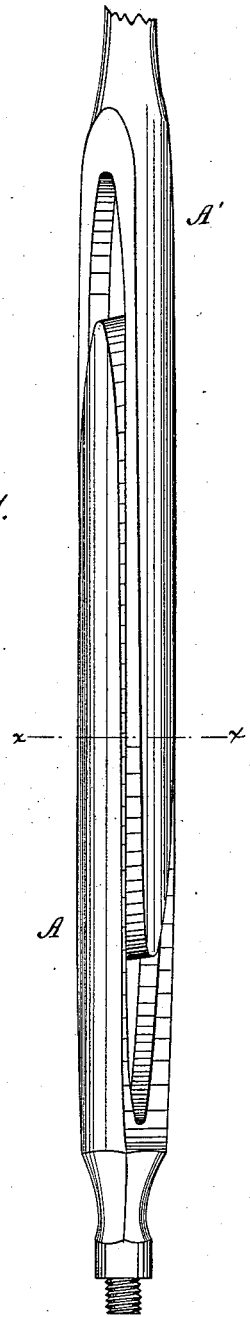
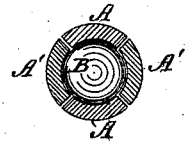
WITNESSES:
W. W. Hollingsworth
Edw. W. Byrn.
INVENTOR:
J. E. Hughes
BY
ATTORNEYS.

UNITED STATES PATENT OFFICE

JAMES E. HUGHES, OF BARNHART'S MILLS, PENNSYLVANIA, ASSIGNOR TO HIMSELF AND MICHAEL O'BRIEN, OF SAME PLACE.

IMPROVEMENT IN DRILL-JARS.

Specification forming part of Letters Patent No. 215,622, dated May 20, 1879; application filed March 25, 1879.

*To all whom it may concern:*

Be it known that I, JAMES E. HUGHES, of Barnhart's Mills, in the county of Butler and State of Pennsylvania, have invented a new and Improved Drill-Jar; and I do hereby declare that the following is a full, clear, and exact description of the same, reference being had to the accompanying drawings, forming part of this specification, in which—

Figure 1 is a side view. Fig. 2 is a sectional view. Fig. 3 is a transverse section through line *x x*, Fig. 1.

My invention relates to an improvement in drill-jars. These devices are in the nature of two loosely-coupled parts, one of which is attached to the drilling-tool, and the other to the line of rope operating the tool, so that when the rope is alternately raised and lowered to cause the drilling-tool to deliver a series of blows, one part of the device in rising strikes the other with a quick blow, which loosens the drilling-tool and allows it to be raised for the next descent upon the rock.

My invention is an improvement upon that form of drill-jar made in two parts coupled together like links; and it consists in forming the links with rounded outer and inner surfaces, and cylindrical anvils or striking-heads inside, arranged at the ends of the links to come in contact with each other with a sudden impact when the drilling-tool is to be lifted.

In the drawings, A A' represent the two parts of the drill-jar, which are coupled together after the manner of two links of a cable-chain, but are made elongated and rounded upon their exterior faces, so as to conform to the small diameter and circular character of the hole in which they reciprocate. The inside of the bars of these links A A' are made rounding in cross-section, so as to form a cylindrical chamber and secure as large a striking-surface as possible.

B B' are the anvils or striking-heads, which are of a cylindrical form and have rounded faces, the same being placed in the ends of their respective links, so as to completely fill the circular space within. When the links are moved away from each other the anvils or heads strike each other, and a sufficient jar is imparted to the drilling-tool to loosen it and allow it to be raised to a position for delivering another blow.

In defining my invention more clearly, I would state that I do not claim as my invention anything shown in the Patent No. 137,378. In the drill-jar described in such patent, the links are not longitudinal segments of a hollow cylinder, but are flat on their inner sides, and the anvils are square. With this construction the corners of the anvil are liable to curl over and wedge themselves into the spaces between the links, causing the latter to become jammed instead of working freely, while the square form gives a much more limited size of anvil. Now, it is especially desirable for strength and durability to have a large anvil. By making the links round upon both inside and outside, or in the form of longitudinal segments of a hollow cylinder, I am enabled to employ a cylindrical anvil, which presents the largest possible area, and has no corners to curl over and obstruct the free movement of the links. I therefore limit my invention to this peculiar construction.

Having thus described my invention, what I claim as new is—

1. A drill-jar composed of two links, A A', rounded upon their inner sides, and coupled as shown, and having cylindrical heads or anvils B B', for the purpose set forth.

2. A drill-jar composed of two links, A A', made in the form of longitudinal segments of a hollow cylinder, coupled together as shown, and having at their ends cylindrical heads or anvils B B', located between the rounded sides, substantially as described.

JAMES EDWARD HUGHES.

Witnesses:
J. H. CUNNINGHAM,
J. M. SMALL.